(12) United States Patent
Turby

(10) Patent No.: US 7,871,188 B1
(45) Date of Patent: Jan. 18, 2011

(54) MOTORCYCLE RIDER ILLUMINATING SYSTEM

(76) Inventor: H Robert Turby, 123 Buffalo Gap, Seguin, TX (US) 78155

( * ) Notice: Subject to any disclaimer, the term of this patent is extended or adjusted under 35 U.S.C. 154(b) by 365 days.

(21) Appl. No.: 12/101,124

(22) Filed: Apr. 10, 2008

(51) Int. Cl.
*F21V 33/00* (2006.01)

(52) U.S. Cl. ............... 362/473; 362/543; 362/540; 362/541; 362/497; 362/499

(58) Field of Classification Search ............ 362/473
See application file for complete search history.

(56) References Cited

U.S. PATENT DOCUMENTS

| | | | | |
|---|---|---|---|---|
| 1,795,940 | A | * | 3/1931 | Falge .................. 362/498 |
| 2,694,138 | A | * | 11/1954 | Schwinn ............... 362/102 |
| D276,468 | S | | 11/1984 | Preisler et al. |
| 4,845,599 | A | * | 7/1989 | Lievin ................. 362/473 |
| 5,040,099 | A | * | 8/1991 | Harris ................. 362/473 |
| 5,072,339 | A | * | 12/1991 | Shimojo ............... 362/473 |
| 5,713,653 | A | * | 2/1998 | White et al. ........... 362/473 |
| 5,754,097 | A | | 5/1998 | Vredenburgh |
| 5,856,779 | A | | 1/1999 | Friday |
| 6,120,167 | A | * | 9/2000 | Nace .................. 362/473 |
| 6,784,795 | B1 | | 8/2004 | Pories et al. |
| 6,863,425 | B2 | | 3/2005 | Hatfield, Jr. |
| 7,109,857 | B2 | | 9/2006 | Ross, Jr. et al. |
| 2005/0275193 | A1 | | 12/2005 | Lee |

* cited by examiner

*Primary Examiner*—Laura Tso

(57) ABSTRACT

A motorcycle rider illuminating system includes a motorcycle that includes a rear wheel, a seat and a fender mounted over the rear wheel. A housing is mounted on the fender. An upper light emitter is mounted on an upper side of the housing and is electrically coupled to the motorcycle. The upper light emitter is turned on and emits light when the motorcycle is turned on. The upper light emitter emits light toward the seat to illuminate a motorcyclist's back when the motorcyclist is positioned on the seat.

3 Claims, 4 Drawing Sheets

MOTORCYCLE RIDER ILLUMINATING SYSTEM

BACKGROUND OF THE INVENTION

Field of the Invention

The present invention relates to motorcycle illuminating devices and more particularly pertains to a new motorcycle illuminating device for illuminating the back of a motorcyclist so that the motorcyclist is more easily seen when riding a motorcycle and accidents are prevented.

SUMMARY OF THE INVENTION

The present invention meets the needs presented above by generally comprising a motorcycle that includes a rear wheel, a seat and a fender mounted over the rear wheel. A housing is mounted on the fender. An upper light emitter is mounted on an upper side of the housing and is electrically coupled to the motorcycle. The upper light emitter is turned on and emits light when the motorcycle is turned on. The upper light emitter emits light toward the seat to illuminate a motorcyclist's back when the motorcyclist is positioned on the seat.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
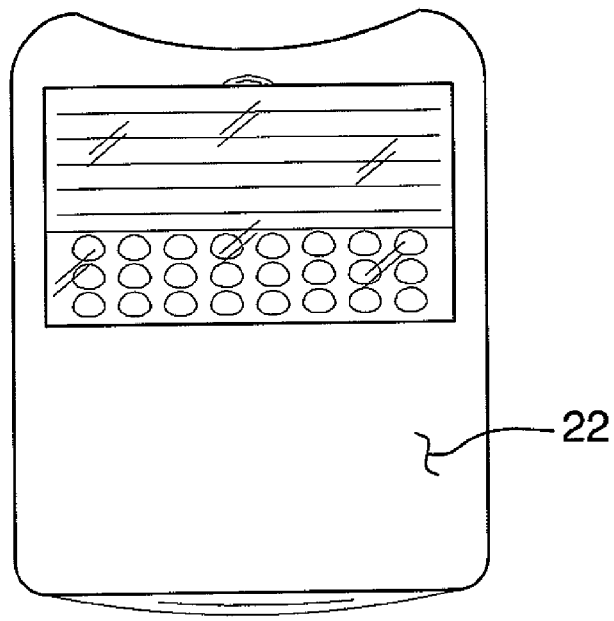
FIG. 1 is a top view of a motorcycle rider illuminating system according to the present invention.
Figure 2:
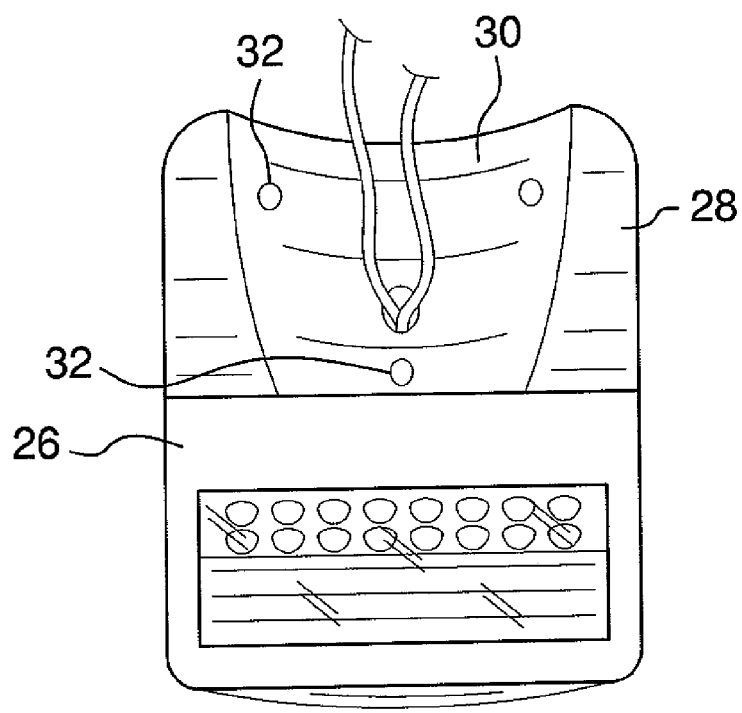
FIG. 2 is a bottom view of the present invention.
Figure 3:
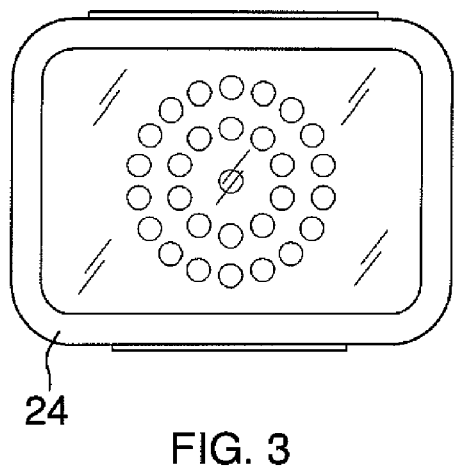
FIG. 3 is a rear view of the present invention.
Figure 4:
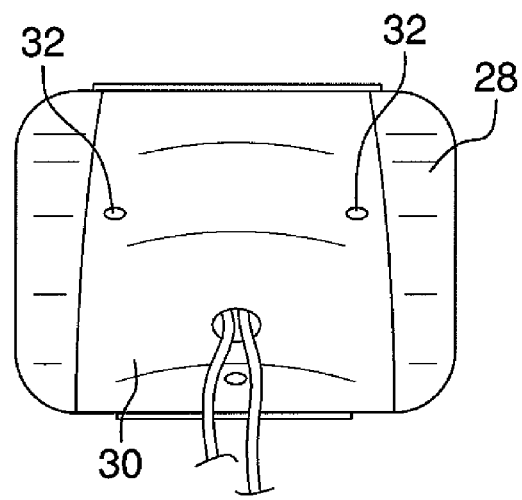
FIG. 4 is a front view of the present invention.
Figure 5:
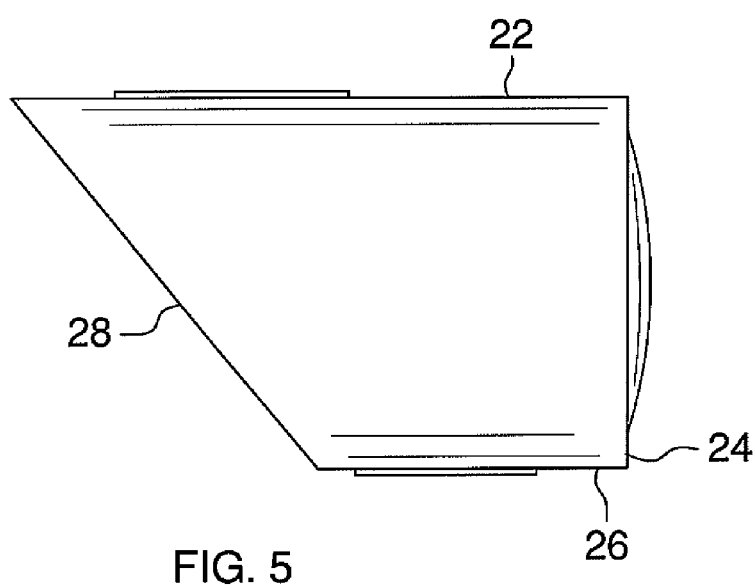
FIG. 5 is a side view of the present invention.
Figure 6:
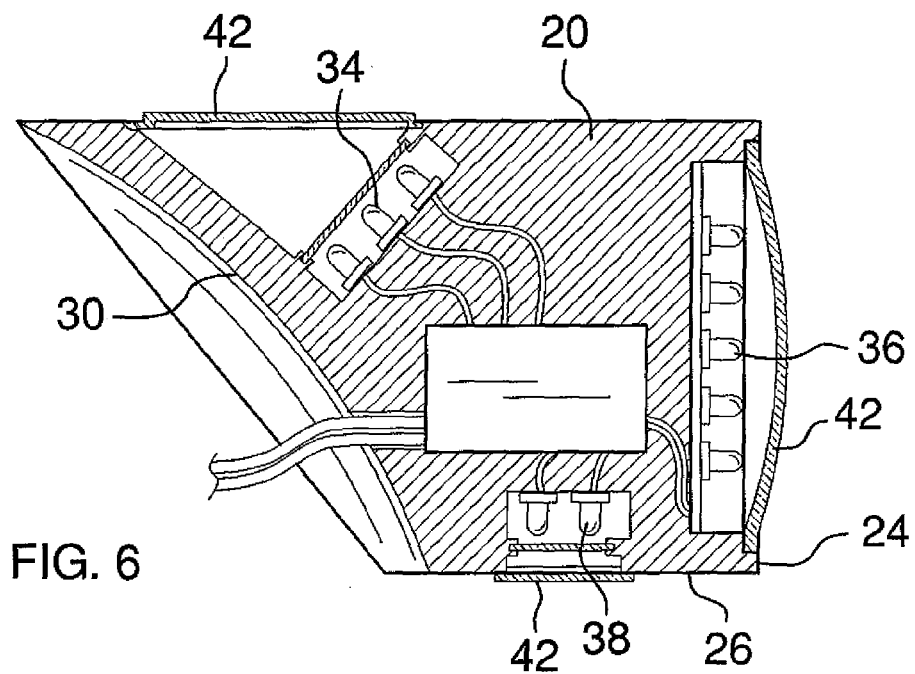
FIG. 6 is a cross-sectional view of the present invention.
Figure 7:
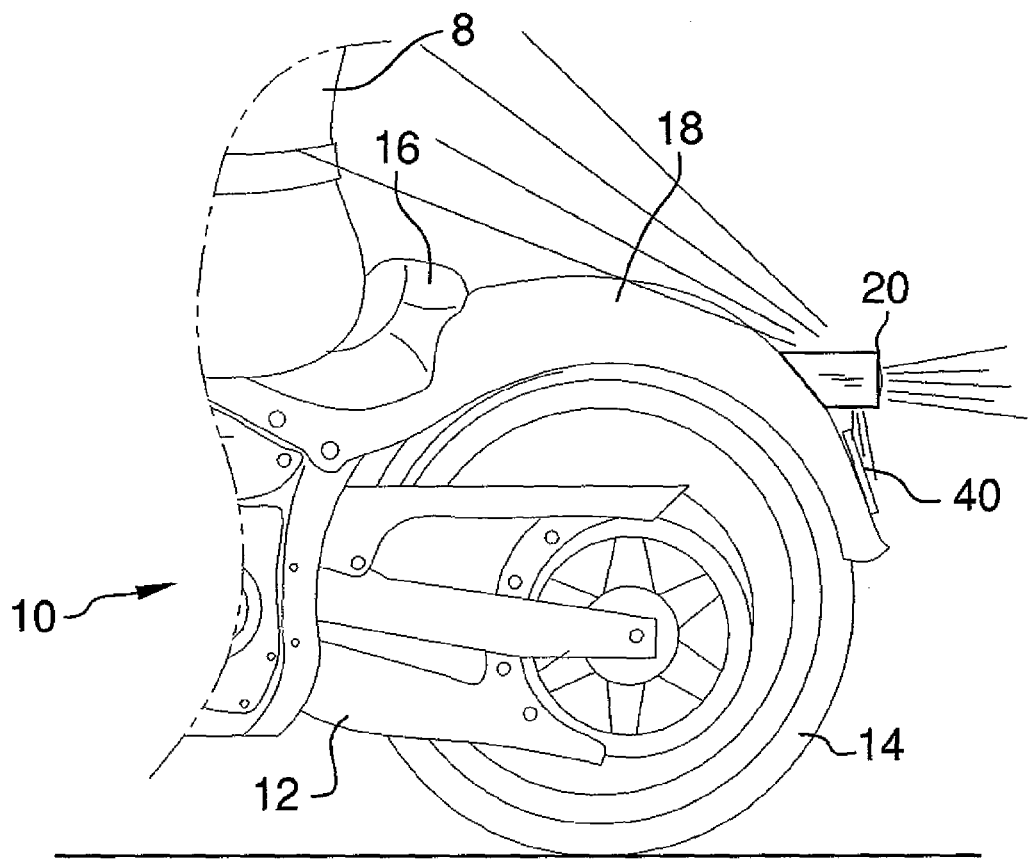
FIG. 7 is a side in-use view of the present invention.
Figure 8:
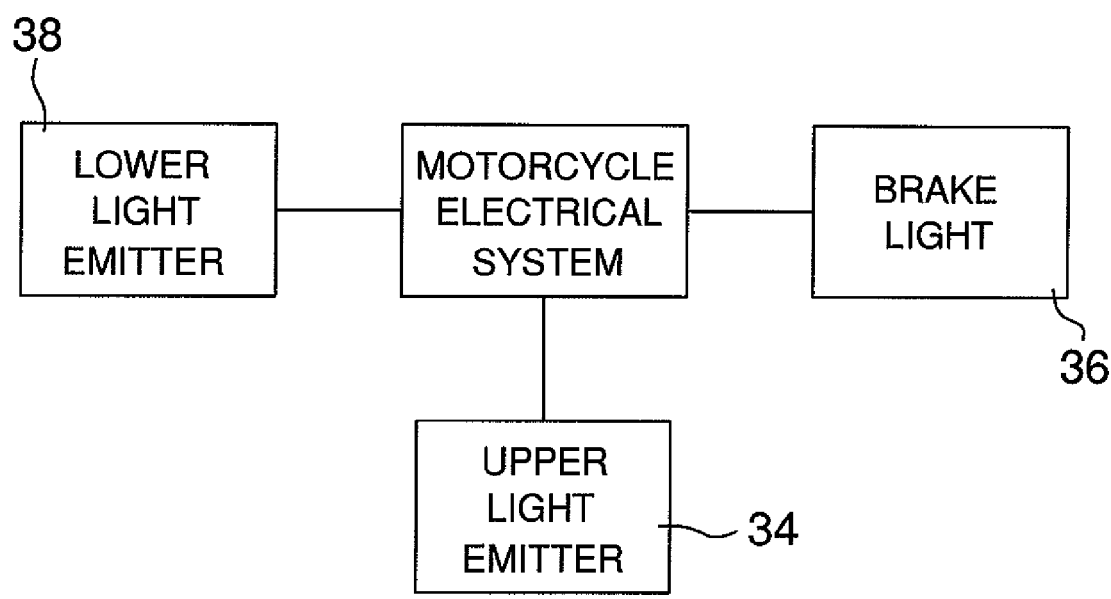
FIG. 8 is a schematic view of the present invention.

With reference now to the drawings, and in particular to FIGS. 1 through 8 thereof, a new motorcycle illuminating device embodying the principles and concepts of the present invention and generally designated by the reference numeral 10 will be described.

As best illustrated in FIGS. 1 through 8, the motorcycle rider illuminating system 10 generally comprises a conventional motorcycle 12 that includes a rear wheel 14, a seat 16 and a fender 18 mounted over the rear wheel 14.

A housing 20 is mounted on the fender 18. The housing 20 includes an upper side 22, a rear side 24, a lower side 26 and a forward side 28. The forward side 28 may have a concave depression 30 therein to match a shape of the fender 18. Fasteners, not shown, may be extended through the fender 18 and into mounting holes 32 extending into the housing 20.

An upper light emitter 34 is mounted on the upper side 22 of the housing 20. The upper light emitter 34 is electrically coupled to the motorcycle 12 and is turned on to emit light when the motorcycle 12 is turned on. The upper light emitter 34 emits light toward the seat 16 to illuminate a motorcyclist's back 8 when the motorcyclist is positioned on the seat 16.

A brake light 36 is mounted on the rear side 24 of the housing 20 and is directed rearward of the motorcycle 12. The brake light 36 is electrically coupled to the motorcycle 12 and is illuminated at a lower intensity when the motorcycle 12 is turned on and at a higher intensity when brakes of the motorcycle 12 are applied.

A lower light emitter 38 is mounted on the lower side 26 of the housing 20. The lower light emitter 38 is directed toward a license plate 40 of the motorcycle 12. The lower light emitter 38 is electrically coupled to the motorcycle 12 and is turned on and emits light when the motorcycle 12 is turned on. Each of the upper light emitter 34, brake light 36 and lower light emitter 38 may be comprised of a plurality of light emitting diodes and covered with a lens 42 that may be colored.

In use, the motorcycle 12 is driven in a conventional manner and the upper light emitter 34 will illuminate the back 8 of the motorcyclist as they ride the motorcycle 12. This will provide easier viewing of the motorcyclist to other drivers positioned behind the motorcycle 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorcyclist lighting system comprising:
   a motorcycle including a rear wheel, a seat and a fender mounted over said rear wheel;
   a housing being mounted on the fender; and
   an upper light emitter being mounted on an upper side of said housing, said upper light emitter being electrically coupled to said motorcycle, said upper light emitter being turned on and emitting light when said motorcycle is turned on, said upper light emitter emitting light toward said seat to illuminate a motorcyclist's back when the motorcyclist is positioned on said seat;
   a lower light emitter being mounted on a lower side of said housing, said lower light emitter being directed toward a license plate of said motorcycle, said lower light emitter being electrically coupled to said motorcycle and being turned on and emitting light when said motorcycle is turned on.

2. The system according to claim 1, further including a brake light being mounted on a rear side of said housing and being directed rearward of said motorcycle, said brake light being electrically coupled to said motorcycle and being illuminated at a lower intensity when said motorcycle is turned on and at a higher intensity when brakes of said motorcycle are applied.

3. A motorcyclist lighting system comprising:
- a motorcycle including a rear wheel, a seat and a fender mounted over said rear wheel;
- a housing being mounted on the fender;
- an upper light emitter being mounted on an upper side of said housing, said upper light emitter being electrically coupled to said motorcycle, said upper light emitter being turned on and emitting light when said motorcycle is turned on, said upper light emitter emitting light toward said seat to illuminate a motorcyclist's back when the motorcyclist is positioned on said seat;
- a brake light being mounted on a rear side of said housing and being directed rearward of said motorcycle, said brake light being electrically coupled to said motorcycle and being illuminated at a lower intensity when said motorcycle is turned on and at a higher intensity when brakes of said motorcycle are applied; and
- a lower light emitter being mounted on a lower side of said housing, said lower light emitter being directed toward a license plate of said motorcycle, said lower light emitter being electrically coupled to said motorcycle and being turned on and emitting light when said motorcycle is turned on.

\* \* \* \* \*